(12) United States Patent
Paasch et al.

(10) Patent No.: US 10,397,379 B2
(45) Date of Patent: Aug. 27, 2019

(54) ROBUST MULTIPATH TCP STATELESS CONNECTION ESTABLISHMENT

(71) Applicant: Apple Inc., Cupertino, CA (US)

(72) Inventors: Christoph Paasch, Cupertino, CA (US); Anumita Biswas, Santa Clara, CA (US); Darren Haas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 15/061,230

(22) Filed: Mar. 4, 2016

(65) Prior Publication Data

US 2016/0261722 A1 Sep. 8, 2016

Related U.S. Application Data

(60) Provisional application No. 62/129,170, filed on Mar. 6, 2015.

(51) Int. Cl.
| | | |
|---|---|---|
| *H04L 29/06* | (2006.01) | |
| *H04L 12/801* | (2013.01) | |
| *H04L 12/707* | (2013.01) | |
| *H04L 29/08* | (2006.01) | |
| *H04W 76/15* | (2018.01) | |
| *H04W 80/06* | (2009.01) | |

(52) U.S. Cl.
CPC ............ *H04L 69/14* (2013.01); *H04L 47/193* (2013.01); *H04L 69/163* (2013.01); *H04L 45/24* (2013.01); *H04L 67/14* (2013.01); *H04L 67/142* (2013.01); *H04L 69/16* (2013.01); *H04W 76/15* (2018.02); *H04W 80/06* (2013.01)

(58) Field of Classification Search
CPC ......... H04L 69/14; H04L 69/08; H04L 45/08; H04L 45/24; H04L 47/2441; H04L 69/163; H04L 69/24; H04L 47/193; H04L 69/16; H04L 67/142; H04L 67/14; H04W 76/10; H04W 76/15; H04W 80/06
USPC .................................. 370/235, 329, 328, 437
See application file for complete search history.

(56) References Cited

U.S. PATENT DOCUMENTS

| | | | |
|---|---|---|---|
| 2014/0153583 A1* | 6/2014 | Gouache | H04L 45/24 370/437 |
| 2014/0351447 A1 | 11/2014 | Annamalaisami et al. | |
| 2014/0362765 A1* | 12/2014 | Biswas | H04L 45/24 370/328 |
| 2015/0201046 A1* | 7/2015 | Biswas | H04W 76/10 370/329 |
| 2015/0281367 A1 | 10/2015 | Nygren et al. | |
| 2015/0296415 A1* | 10/2015 | Ling | H04L 69/08 370/329 |
| 2015/0350337 A1 | 12/2015 | Biswas | |
| 2016/0094467 A1* | 3/2016 | Hong | H04L 47/2441 370/235 |
| 2016/0218960 A1* | 7/2016 | Sundarababu | H04L 45/08 |
| 2016/0309534 A1* | 10/2016 | Teyeb | H04L 69/14 |

FOREIGN PATENT DOCUMENTS

WO 2015086543 A1 6/2015

* cited by examiner

*Primary Examiner* — Jungwon Chang
(74) *Attorney, Agent, or Firm* — Meyertons Hood Kivlin Kowert and Goetzel PC; Jeffrey C. Hood

(57) ABSTRACT

Robust Multipath TCP Stateless Connection Establishment.

20 Claims, 5 Drawing Sheets

US 10,397,379 B2

ROBUST MULTIPATH TCP STATELESS CONNECTION ESTABLISHMENT

PRIORITY INFORMATION

This application claims priority to U.S. provisional patent application Ser. No. 62/129,170, entitled "Robust Multipath TCP Stateless Connection Establishment," filed Mar. 6, 2015, which is hereby incorporated by reference in its entirety as though fully and completely set forth herein.

FIELD

The present disclosure relates to electronic devices, including apparatuses, systems, and methods for performing robust Multipath TCP stateless connection establishment.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Some of these standards may serve complementary functions while others may typically be considered competitors attempting to fulfill similar needs amongst consumers. Accordingly, it is common for at least some wireless devices to communicate using multiple wireless technologies or standards. For example, some wireless devices (such as some smart phones, etc.) may be capable of cellular communication as well as Wi-Fi communication.

SUMMARY

Embodiments are presented herein of, inter alia, apparatus, systems, and methods for performing robust Multipath TCP (MPTCP) stateless connection establishment.

According to the techniques described herein, it may be possible to reliably establish a MPTCP connection when communicating with one or more servers that behave in a stateless manner. This may be achieved, according to some embodiments, by combining information for state reconstruction at the server (the MPTCP-keys) with a data-segment. As the data-segment may be delivered in a reliable manner (e.g., according to TCP's retransmission mechanism), the required information may be delivered in a reliable manner as well. MPTCP may thus be used in a reliable way with servers behaving in a stateless manner. Additionally, at least in some instances the relation between the initial data sequence number and the MPTCP-keys may be leveraged to reduce the amount of TCP option space consumed to provide such information.

The techniques described herein may be implemented in and/or used with a number of different types of devices, including but not limited to portable media players, cellular phones, tablet computers, wearable devices, set top box devices, television systems, load balancers, servers, and other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings, in which.

Figure 1:
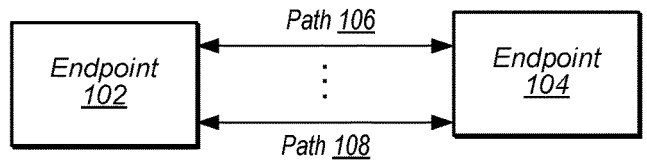
FIGS. 1-2 illustrate example (and simplified) wireless communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) that is easily transported by a user and capable of wireless communication.

Wireless Device—any of various types of computer systems devices that are mobile, portable, or fixed and that perform wireless communications. Examples of wireless devices include mobile wireless devices (e.g., UE devices, such as smart phones, portable gaming devices, wearable devices, etc.) as well as stationary wireless devices (e.g., desktop computers, access point devices, etc.). In general, the term "wireless device" can be broadly defined to encompass any electronic, computing, and/or telecommunications device (or combination of devices) that is capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
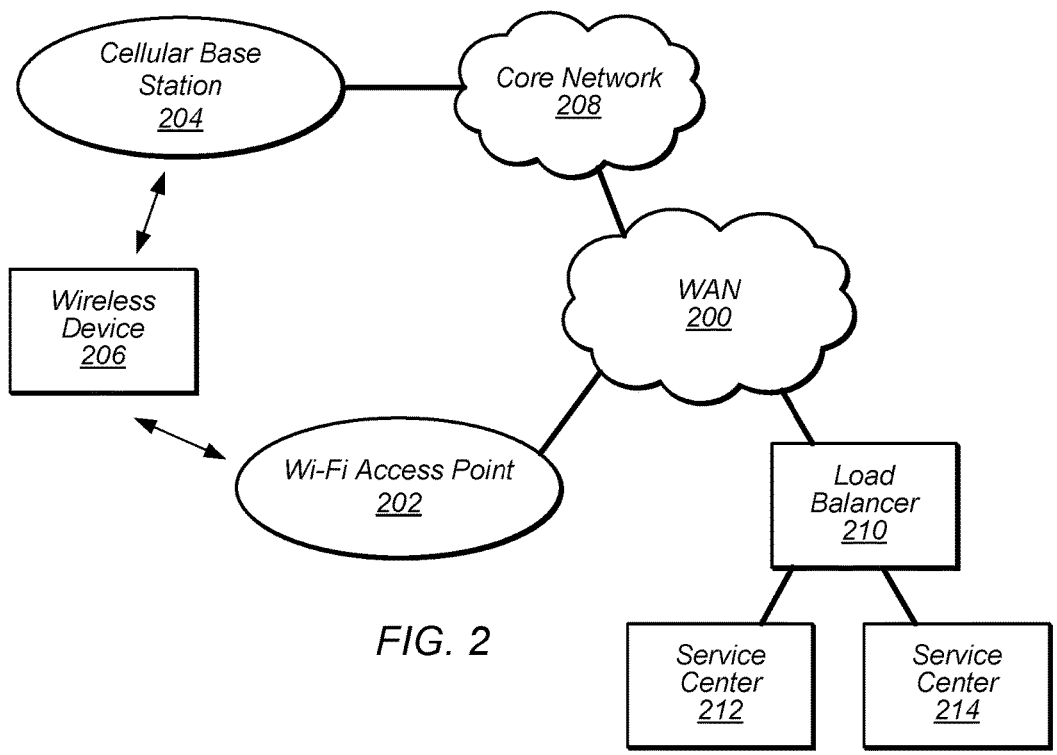

FIGS. 1-2—Communication Systems

FIGS. 1-2 illustrate exemplary (and simplified) communication systems, according to some embodiments. It is noted that the systems of FIGS. 1-2 are merely examples of possible systems, and embodiments may be implemented in any of various systems, as desired.

The exemplary wireless communication system illustrated in FIG. 1 includes two endpoints having multiple communication paths between them. Thus, endpoint 102 may be capable of communicating with endpoint 104 via path 106 and/or path 108, as well as any other path between them.

Each of endpoint 102 and endpoint 104 may be a 'fixed' or 'mobile' endpoint. A fixed endpoint may be an endpoint that is substantially stationary and/or that communicates by way of one or more wired communication techniques. Some examples might include a server computer providing cloud-based services via the Internet, a bridge, a load balancer, a personal desktop computer or workstation, a set top box, a television, etc. A mobile endpoint may be an endpoint that is substantially mobile and/or that communicates by way of one or more wireless communication techniques. Some examples might include a mobile telephone (e.g., a smart phone), tablet computer, portable gaming device, portable media player, etc. Note that hybrid endpoints, which share traits of both fixed and mobile endpoints, are also possible. For example, many laptop computers may be capable of performing both wireless (e.g., Wi-Fi, among other possibilities) and wired (e.g., Ethernet, among other possibilities) communication, and additionally may be capable of substantial movement (e.g., when operating from battery power) or may be substantially stationary (e.g., when docked and/or connected to a wall outlet for power) at various times.

One or both of endpoints 102, 104 may be multi-homed. For example, one or both of endpoint 102, 104 may be capable of communicating via multiple network interfaces during an overlapping time period. As such, there may be multiple possible communication paths 106, 108 between endpoints 102, 104. Note that although two paths (i.e., path 106 and path 108) are illustrated in FIG. 1, it should be noted that any number of paths may exist between endpoints. For example, if each of endpoints 102, 104 are capable of communicating via two different network interfaces, there might be four possible communication paths between them. Other numbers of different network interfaces and possible communication paths are also possible.

The multiple communication paths 106, 108 may be used to establish a multipath transmission control protocol (MPTCP) link or connection between endpoints 102 and 104. The MPTCP connection may be established according to and/or include any of various features described in the MPTCP specification IETF RFC 6824. For example, one or more subflows of the MPTCP connection may be established over path 106, while one or more subflows of the MPTCP connection may be established over path 108. Any number of additional subflows may optionally be created over one or more other paths, if desired. Such an MPTCP connection may be established and configured/controlled by endpoints 102 and 104 according to various aspects of the present disclosure.

The exemplary wireless communication system illustrated in FIG. 2 represents one possible communication system having the characteristics of the exemplary communication system illustrated in FIG. 1. In particular, a first endpoint (i.e., a wireless device 206) may be capable of communicating with another endpoint (e.g., load balancer 210 or one of service centers 212, 214) using either of a first communication path (i.e., via cellular base station 204, core network 208, and wide area network 200) or a second communication path (i.e., via Wi-Fi access point 202 and wide area network 200).

As shown, the wireless device 206 communicates with a Wi-Fi access point 202 and with a cellular base station 204. The access point 202 may be an access point providing a wireless local area network (WLAN). The access point 202 may be equipped to communicate with a wide area network (WAN) 200, such as the Internet. Thus, the access point 202 may facilitate communication between the wireless device 206 and the WAN 200. The access point 202 and the wireless device 206 may be configured to communicate over the transmission medium using Wi-Fi, including any of various versions of IEEE 802.11 (e.g., a, b, g, n, ac, etc.). Note that the access point 202 may also facilitate communication between the wireless device 206 and other computing devices that also participate in the WLAN directly.

The base station 204 may be a base transceiver station (BTS) or cell site (a "cellular base station"), and may include hardware that enables wireless communication with cellular devices (such as wireless device 206) according to one or more cellular communication protocols. The wireless device 206 and the cellular base station 204 may communicate using any of various cellular communication technologies, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a core network 208 of a cellular service provider. Thus, the base station 204 may facilitate communication between the wireless device 206 and the core network 208. The core network 208 may in turn be equipped to communicate with WAN 200 (e.g., the Internet, or another wide area network). Note that the core network 208 may also or alternatively be equipped to communicate with one or more other networks (e.g., a telecommunication network such as a public switched telephone network (PSTN), one or more core networks of other cellular service providers, etc.). The cellular base station 204 may thus provide the wireless device 206 (and potentially numerous other wireless devices) with various telecommunication capabilities, such as voice, SMS services, and/or data services.

Thus, wireless device 206 may be capable of communicating using multiple wireless communication standards, including at least one wireless networking protocol (e.g., Wi-Fi) and at least one cellular communication protocol (e.g., GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), etc.). Note additionally that the wireless device 206 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. In addition, or as an alternative, the wireless device 106 may be capable of communicating using one or more wired communication standards. For example, the wireless device 206 may be capable of communicating with one or more wired access points, e.g., via Ethernet. It may, for example, be possible for the wireless device 206 to couple via wired means to the WAN 200 in addition to or as an alternative to utilizing Wi-Fi communication. Other combinations of wireless and wired communication standards (including more than two wireless and/or wired communication standards) are also possible.

The load balancer 210 may also be equipped to communicate with WAN 200. The load balancer 210 may provide access to a cluster or server farm configured to provide one or more cloud-based services via the Internet. For example, as shown, the load balancer may further be equipped to communicate with service centers 212, 214, which may each include one or more computing devices (e.g., servers) configured to provide cloud-based services. Each service center might, for example, be configured to provide service with respect to a particular application, such as a mapping application, an intelligent personal assistant application, an e-commerce application, a media streaming application, a gaming application, etc. It should be noted that while load balancer 210 is shown in FIG. 2 as one possible exemplary access port (and potential MPTCP endpoint) to service centers 212, 214, any of various devices may be used (alternatively or in combination with load balancer 210) as intermediary/access port devices/entities to the service centers 212, 214 if desired, such as gateways, routers, firewalls, and/or any of various other "middleboxes". In addition, it should be noted that while not explicitly shown, the load balancer 210 may include any number of network interfaces for connecting to the WAN 200, including one or more wired network interfaces and/or one or more wireless network interfaces.

Note that while load balancer 210 may act as one possible MPTCP endpoint in communication with the wireless device 206 in the system illustrated in FIG. 2, either of service centers 212, 214 (among other possible devices) may also or alternatively act as MPTCP endpoints in communication with the wireless device 206 (and/or other nodes not shown) according to aspects of this disclosure.

Figure 3:
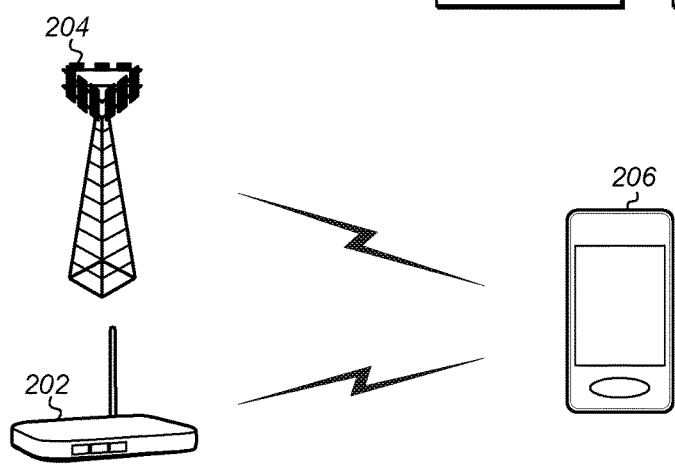
FIG. 3 illustrates an example cellular base station and a Wi-Fi access point in communication with a wireless user equipment device.

FIG. 3 illustrates the wireless device 206 in communication with the cellular base station 204 and the Wi-Fi access point 202, according to some embodiments. The wireless device 206 may be a device with multiple wireless network connectivity such as a mobile phone, a hand-held device, a wearable device, a computer or a tablet, or virtually any type of wireless device.

The wireless device 206 may include a processor that is configured to execute program instructions stored in memory. The wireless device 206 may perform any of the method embodiments described herein by executing such stored instructions. Alternatively, or in addition, the wireless device 206 may include a programmable hardware element, such as an FPGA (field-programmable gate array), CPLD, or ASIC, that is configured to perform any of the method embodiments described herein, or any portion of any of the method embodiments described herein.

The wireless device 206 may be configured to communicate using any of multiple wireless communication protocols. For example, the wireless device 206 may be configured to communicate using at least one cellular communication protocol (such as CDMA2000, LTE, LTE-A, etc.) and Wi-Fi. Other combinations of wireless and/or wired communication standards are also possible.

The wireless device 206 may include one or more antennas for communicating using one or more wireless communication protocols or technologies. In one embodiment, the wireless device 206 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 206 may share one or more parts of a receive and/or transmit chain between multiple wireless communication technologies, such as those discussed above.

In some embodiments, the wireless device 206 may include separate (and possibly multiple) transmit and/or receive chains (e.g., including separate RF and/or digital radio components) for each wireless communication protocol with which it is configured to communicate. As a further possibility, the wireless device 206 may include one or more radios which are shared between multiple wireless communication protocols, and one or more radios which are used exclusively by a single wireless communication protocol. For example, the wireless device 206 might include a shared radio for communicating using either of LTE or 1×RTT (or LTE or GSM), and separate radios for communicating using each of Wi-Fi and Bluetooth. Other configurations are also possible.

Figure 4:
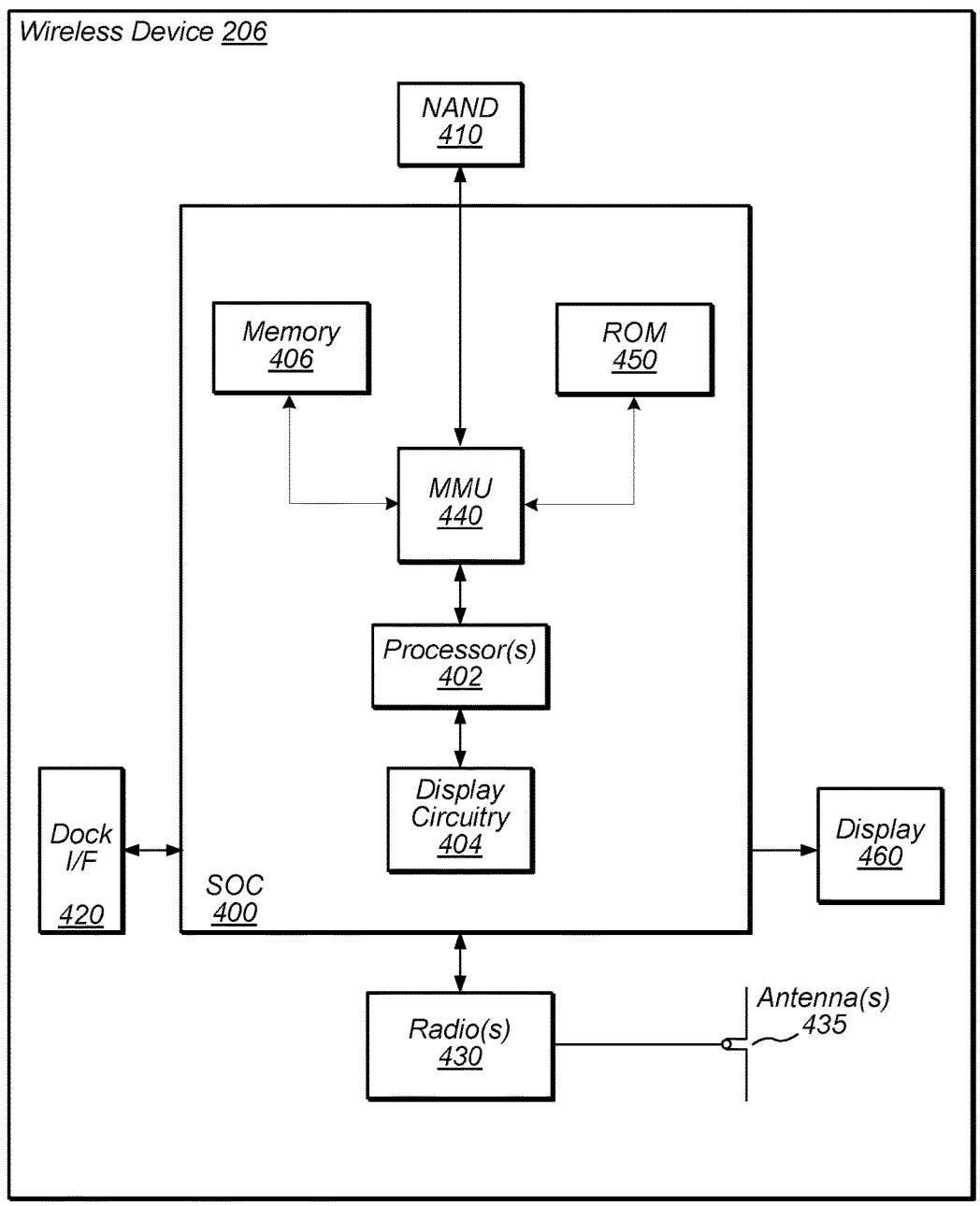
FIG. 4 illustrates an example block diagram of a wireless user equipment device.

FIG. 4—Exemplary Block Diagram of a Wireless Device

FIG. 4 illustrates an exemplary block diagram of a wireless device 206, according to some embodiments. As shown, the wireless device 206 may include a system on chip (SOC) 400, which may include portions for various purposes. For example, as shown, the SOC 400 may include processor(s) 402, which may execute program instructions for the wireless device 206 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), Dock I/F 420, and/or display 460. The MMU 440 may be configured to perform memory protection and page table translation or set up. In some embodiments, the MMU 440 may be included as a portion of the processor(s) 402.

As shown, the SOC 400 may be coupled to various other circuits of the wireless device 206. For example, the wireless device 206 may include various types of memory (e.g., including NAND flash 410), a connector interface 420 (e.g., for coupling to a computer system, dock, charging station, etc.), the display 460, and wireless communication circuitry (or "radio(s)") 430 (e.g., for LTE, LTE-A, CDMA2000, Bluetooth, Wi-Fi, GPS, etc.).

The wireless device 206 may include at least one antenna (and possibly multiple antennas, e.g., for MIMO and/or for implementing different wireless communication technologies, among various possibilities), for performing wireless communication with base stations, access points, and/or other devices. For example, the wireless device 206 may use antenna(s) 435 to perform the wireless communication.

The wireless device 206 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 6:
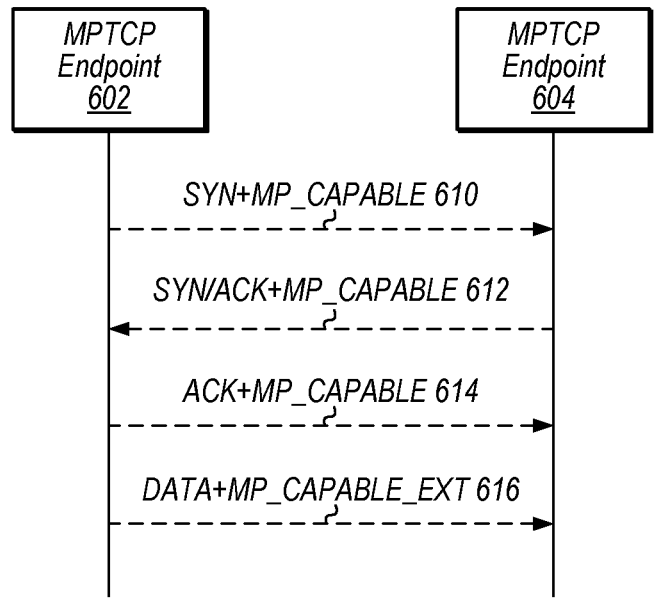
FIGS. 6-8 are message sequence charts illustrating example message sequences which might occur when performing robust MPTCP stateless connection establishment.
Figure 7:
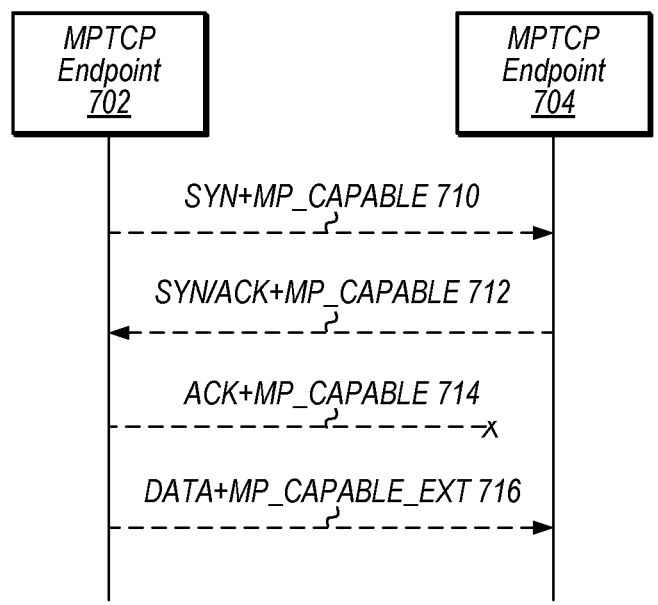
Figure 8:
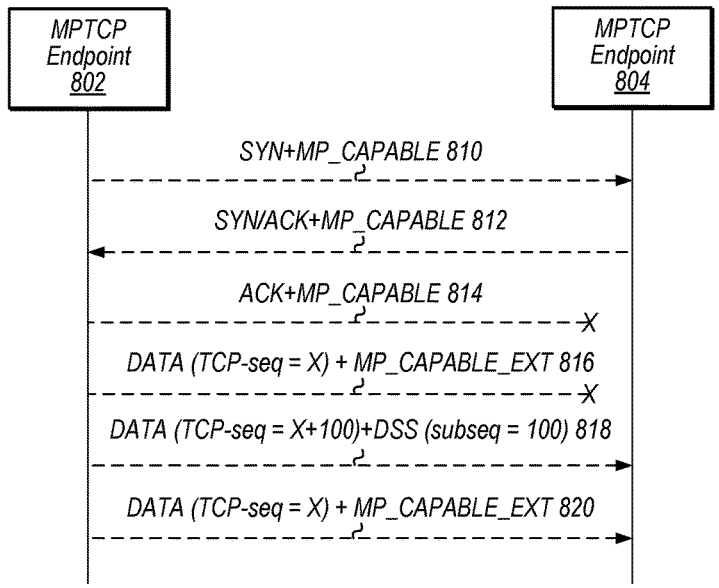

As described herein, the wireless device 206 may include hardware and/or software components for implementing features for performing robust MPTCP stateless connection establishment, such as those described herein with reference to, inter alia, FIGS. 6-8. The processor 402 of the wireless device 206 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the wireless device 206, in conjunction with one or more of the other components 400, 404, 406, 410, 420, 430, 435, 440, 450, 460 may be configured to implement part or all of the features described herein, such as the features described herein with reference to, inter alia, FIGS. 6-8.

Figure 5:
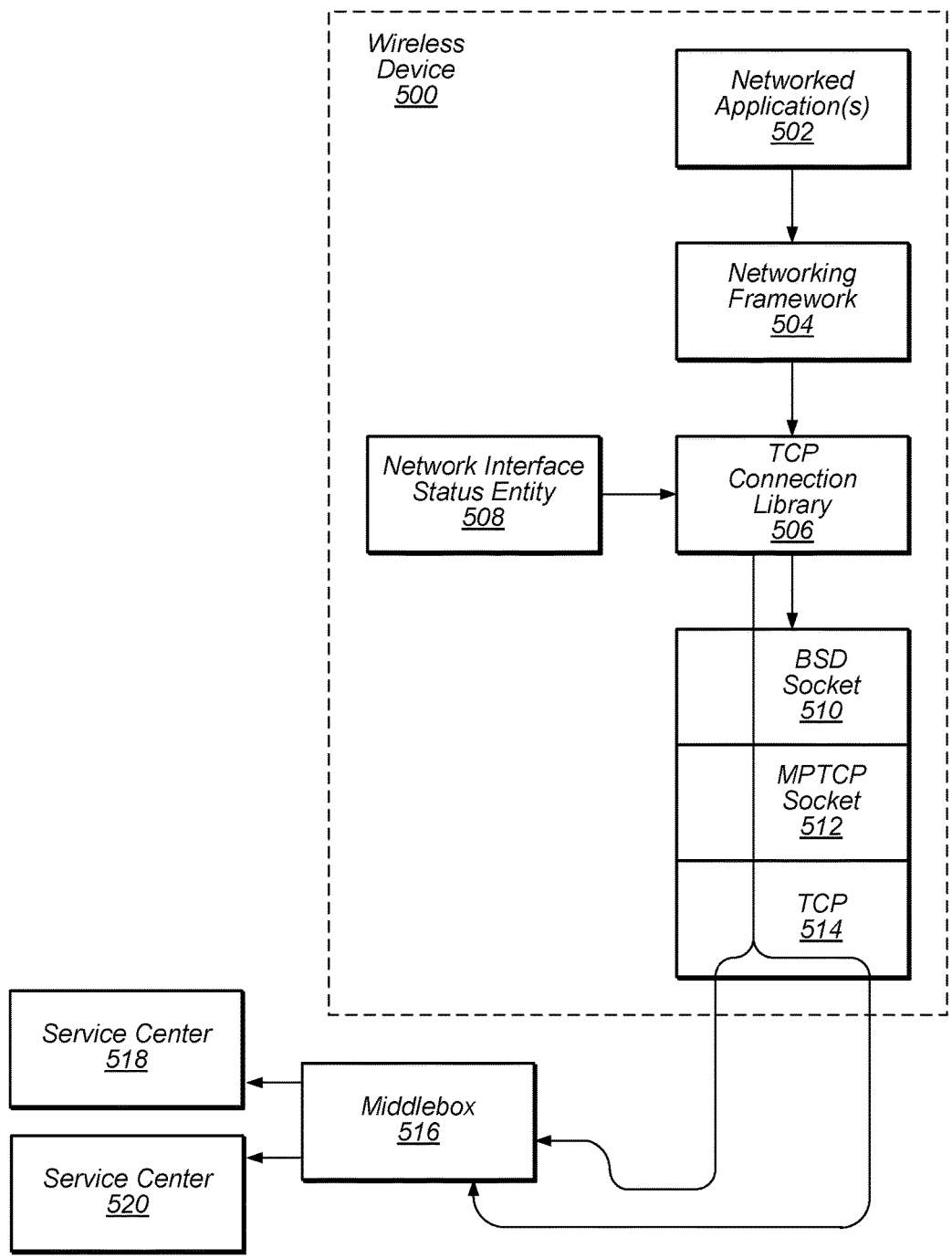
FIG. 5 illustrates an example protocol stack which may be used in conjunction with multipath transmission control protocol (MPTCP) communications.

FIG. 5—MPTCP Capable Protocol Stack

FIG. 5 illustrates an exemplary protocol stack that may be used by a wireless device 500 to establish, configure, and control MPTCP connections and subflows between the wireless device 500 and a middlebox 516 (which may provide redirection thence to service centers 518, 520), according to some embodiments. Alternatively, or in addition, the exemplary protocol stack illustrated in FIG. 5 may be used to establish, configure, and control MPTCP connections and subflows between the wireless device 500 and either or both of service centers 518, 520. It should be recognized that while the exemplary protocol stack illustrated in FIG. 5 represents one possible protocol stack which may be used to implement aspects of the present disclosure, MPTCP connections and subflows may be established, configured, and/or controlled in conjunction with any of numerous alternate protocol stacks, in conjunction with different devices than wireless device 500 and middlebox 516 and/or service centers 518, 520 (e.g., without an intermediary middlebox 516 or with multiple middleboxes). As such, the exemplary protocol stack illustrated in FIG. 5 should not be considered limiting to the disclosure as a whole.

As shown, one or more networked applications 502 may be executing on the wireless device 500. The networked application(s) may include any application(s) that utilize a network connection to communicate over a network. For example, the application(s) (or "app(s)") 502 may include a any or all of a browser application, email application, chat application, social media application, media streaming application, game application, intelligent personal assistant application, mapping application, and/or any of a variety of other types of networked applications.

The networked application(s) 502 may interface with a networking framework 504, which may be provided by an operating system executing on the wireless device 500. The networking framework 504 may provide a level of abstraction between the application 502 and the lower level networking functionality provided by the wireless device 500. The networking framework 504 may in turn interface with a TCP connection library entity 506. The TCP connection library 506 may have knowledge of the status of various network interfaces, by way of communication with a network interface status entity 508.

The network interface status entity 508 may monitor the up/down status and support network interface upkeep of various network interfaces available to the wireless device 500. Information regarding the status of the various network interfaces available to the wireless device 500 may be particularly helpful for a mobile device, which is capable of utilizing one or more forms of wireless communication, such as cellular communication and Wi-Fi. For example, the network interface status entity 508 may be aware of whether a cellular data link is available at any given time, and may similarly be aware of whether a Wi-Fi link is available at any given time. The network interface status entity 508 may similarly monitor any additional or alternative network interfaces as well. In some cases the network interface status entity 508 may also be aware of any further considerations relating to various available network interfaces, such as network interface use preferences. For example, for many mobile devices, Wi-Fi data communication may be less expensive than cellular data communication (e.g., if a cellular service provider offers metered data usage while a Wi-Fi service provider offers unmetered data usage); in such a case, a preference to use a Wi-Fi network interface rather than a cellular network interface for data communication when possible may be noted by the network interface status entity 508 in the wireless device 500. Other preferences or considerations may also or alternatively be stored.

Being aware of such information by way of its communication with the network interface status entity 508, the TCP connection library 506 may act as a transport connection manager and intelligently manage TCP connections for the networked application 502. For example, the TCP connection library 506 may be capable of initiating and tearing down TCP connections (including MPTCP subflows) with networked entities (such as middlebox 516) via various network interfaces, establishing and/or modifying MPTCP subflow priorities, and asserting control over MPTCP subflow creation and priority status modification, among various possibilities. The TCP connection library 506 may do so by way of socket layers BSD socket 510, MPTCP socket 512, and TCP connection/subflows 514.

As shown, the resulting MPTCP subflow(s) may be established as part of an MPTCP connection with the middlebox 516. The middlebox 516 may include any of a variety of types of middlebox functionality, such as a firewall, load balancing, network address translation, etc. The middlebox 516 may in turn route data to service center 518 or service center 520, and possibly more specifically to a server acting as part of service center 518 or 520 in a separate connection (e.g., according to a load balancing algorithm).

As noted above, it may also be possible for the wireless device 500 to establish one or more MPTCP subflows terminating at one or more of the service centers 518, 520 as an alternative (or in addition) to terminating MPTCP subflows at the middlebox 516.

FIGS. 6-10—Robust MPTCP Stateless Connection Establishment Signal Flows

During the establishment of a TCP connection, a server typically creates state upon the reception of a SYN message. The server typically generates an initial sequence number, and replies to the options indicated in the SYN. The server typically maintains in-memory state for the embryonic connection, for example including state regarding which options were negotiated, such as window scale factor and the maximum segment size (MSS). The server may also maintain state regarding whether selective acknowledgements (SACK) and TCP timestamps were negotiated during the three-way handshake.

However, attackers may be able to exploit this state-creation on the server through a SYN-flooding attack. For example, an attacker may be able to emit SYN-segments with different 4-tuples (source and destination IP addresses and port numbers) in order to make the server create the state and thus consume its memory, while the attacker itself may not need to maintain any state for such an attack.

A common mitigation of this attack may include use of a mechanism called SYN-cookies. SYN-cookies rely on a TCP-connection echoing back certain information that the server includes in the SYN/ACK during the three-way connection establishment handshake. A computing device implementing such a mechanism may be referred to as stateless (e.g., a stateless server), and may be considered to perform "stateless connection establishment", as state for a connection may not immediately be stored (e.g., to reduce vulnerability to denial-of-service attacks), but may instead be stored (e.g., reconstructed) using SYN-cookies based on the third message (ACK) received from the other endpoint of the connection (e.g., upon completion of the three-way connection establishment handshake)

Notably, the sequence-number may be echoed back in the acknowledgment field as well as the TCP timestamp value inside the timestamp option. When generating the SYN/ACK, the server may generate these fields in a verifiable fashion. For example, as one possibility, servers may use the 4-tuple, the client's sequence number plus a local secret (which may change over time) to generate the initial sequence number by applying a hashing function to the aforementioned fields. Further, setting certain bits either in the sequence number or the TCP timestamp value may be a way of encoding, for example, whether SACK has been negotiated and what window-scaling has been received. Upon the reception of the third message (ACK) in the three-way connection establishment handshake, the server may thus be able to verify whether the acknowledgment number is indeed the reply to a SYN/ACK it has generated (e.g., using the 4-tuple and the local secret). Further, the server may be able to decode from the timestamp echo reply the required information concerning SACK, window scaling and MSS-size.

In case the ACK is lost during the three-way handshake of TCP connection establishment, stateless servers may still be able to complete connection establishment if the client initiates the communication by sending data to the server. For example, as the data-segment may include the acknowledgment number for the original SYN/ACK as well as the TCP timestamp value (e.g., as may be required, at least according to some versions of TCP), the server may be able to reconstruct the state even if the third ACK has been lost in the network. However, if the very first data segment is also lost, the server may be unable to reconstruct the connection state and may accordingly respond to subsequent data sent by the client with a TCP reset.

MPTCP may add additional state to a three-way TCP connection establishment handshake. For example, in the case of MPTCP, it may be necessary to store both endpoints' keys in the state so that (e.g., at a later time) new subflows can be established. The initial data sequence numbers for both endpoints may be derived from the keys, and may thus implicitly be available to both endpoints. Accordingly, in order to support stateless servers, in MPTCP, an endpoint may echo the keys in the third ACK. A stateless server may thus be able to generate its own key in a verifiable fashion (similar to the initial sequence number), and may be able to learn the client's key through the echo in the third ACK. The reliance on the third ACK, however, may imply that if this segment gets lost, the server cannot reconstruct the state associated with the MPTCP connection. For example, in case the third ACK gets lost or has been reordered with the first data segment of the client, an MPTCP connection may be forced to fallback to regular TCP, because the server may not be able to infer the client's key from the connection and thus may not be able to generate a valid hash-based message authentication code (HMAC) to establish new subflows, and the server may furthermore not know the initial data sequence number.

Another issue with SYN-cookies, which may be relevant to both regular TCP and MPTCP, may occur in certain cases of packet loss. For example, in a scenario in which the client is sending multiple segments when initiating the connection, it may occur that the third ACK as well as the first data segment are lost. In such a case, the server may only receive the second data segment, and may try to reconstruct the state based on this segment's 4-tuple, sequence number and timestamp value. However, as this segment's sequence number may be different than (e.g. higher than) the client's initial sequence number, the server may not be able to regenerate the appropriate SYN-cookie and thus the verification may fail. In such a case the server may not be able to infer that the sequence number in the segment has gone beyond TCP's initial sequence number. This may cause the server to send a TCP-reset, as it may appear to the server that it has received a segment for which no SYN-cookie has ever been generated.

According to certain embodiments of the present disclosure, it may be possible to increase the robustness of Multipath TCP against the loss of the third ACK when SYN-cookies are being deployed on servers, for example by ensuring that the state-information relevant to Multipath TCP reaches the server in a reliable way. For example, as the client may be initiating the data transfer to the server, and this data may be delivered reliably, the state-information could be delivered together with this data and thus implicitly reliably sent to the server: when the data reaches the server, the state-information reaches the server as well.

According to some embodiments, this may be achieved by defining a new MPTCP subtype, or by defining a new option within a subtype, which may be an extension of or an alternative to the existing MP_CAPABLE option. The new MPTCP subtype/option may be referred to herein as "MP_CAPABLE_EXT, though it should be noted that alternative nomenclature (e.g., "MP_CAPABLE_ACK") may be used if desired. The MP_CAPABLE_EXT option may be solely used on the first data segment sent from the client to the server, according to some embodiments. This option may serve the dual purpose of conveying the client's and server's respective keys as well as the DSS mapping, which would otherwise have been sent in a DSS option on the first data segment. The MP_CAPABLE_EXT option may contain the same set of bits A to H as well as the version number, similar to the MP_CAPABLE option. The server may behave in a stateless manner and thus generate its own key in a verifiable fashion (e.g., as a hash of the 4-tuple, sequence number and a local secret—similar to what is done for the TCP-sequence number in case of SYN-cookies). The server may thus be able to verify whether it is indeed the originator of the key echoed back in the MP_CAPABLE_EXT option.

In some implementations, since the server's key may be generated in a reproducible manner, it may not be necessary for the MP_CAPABLE_EXT option to include the server's key in order for the server to reconstruct the MPTCP state. Thus, in some implementations, the MP_CAPABLE_EXT option may include the client's key but may not include the server's key. This may reduce the length of the MP_CAPABLE_EXT option by 8 bytes (e.g., the length of the server's key), thus reducing signaling overhead and preserving TCP option space (which may in turn help preserve TCP's extensibility for potential future updates). In such a case the presence of the MP_CAPABLE_EXT option in the first data segment may serve as an indication for the server that an MP_CAPABLE option has been exchanged during three-way handshake. It should also be noted that the additional security provided when including the server's key in the MP_CAPABLE_EXT by enabling the server to verify that it is indeed the originator of the key echoed back in the MP_CAPABLE_EXT option may be lost if the server's key is not included in the MP_CAPABLE_EXT.

Further, the option may include the data-level length as well as the checksum (in case it has been negotiated during the three-way handshake). This may allow the server to reconstruct the mapping and deliver the data to the application. It should be noted that the information inside the MP_CAPABLE_EXT may be less explicit than a DSS option, at least in some instances. For example, the data-sequence number, data acknowledgment, as well as the relative subflow-sequence number may not be included in the MP_CAPABLE_EXT, in some embodiments. In such scenarios, the server may nonetheless be able to reconstruct the mapping, e.g., if the MP_CAPABLE_EXT is guaranteed to only be sent on the very first data segment, since this may imply that the relative subflow-sequence number equals 1, and may also imply the data-sequence number, which may be equal to the initial data-sequence number. Note that as an alternative possibility, any or all of the data-sequence number, data acknowledgment, and/or relative subflow-sequence number may also be explicitly included as part of the MP_CAPABLE_EXT option if desired.

As previously noted, if both the third ACK and the first data-segment of a connection are lost when TCP SYN-cookies are in use, there is the potential for the server to reset the TCP connection (e.g., for both regular TCP and MPTCP). However, at least in some instances, the use of MPTCP may actually provide endpoints with the ability to manage such a scenario to avoid reset.

For example, upon reception of the second data segment, the included data sequence mapping may allow the server to detect that this is not the first segment of a TCP connection. The relative subflow sequence number inside the DSS-mapping may be 100, for example, indicating that this segment is ahead of the first data segment in the TCP stream. This may allow the server to reconstruct the initial sequence number ("X") based on the sequence number in the TCP-header (e.g., (X+100)−100=X) that has been provided by the client and verify whether its SYN-cookie is correct. In this case, the server may not send a TCP-reset message, in contrast to regular TCP, in which case the server may not be able to verify the SYN-cookie. Further, as the server knows that the received segment is not the first segment of the data stream, the server may store the received segment temporarily in its out-of-order queue. The server may not yet be able to reconstruct the MPTCP state at this point, but may be able to do so upon receiving the MP_CAPABLE_EXT (e.g., as a retransmission or out-of-order reception of the first data segment). In other words, MPTCP's DSS option may allow handling of the loss of the first data segment without resetting the TCP connection, as the host may be able to infer the initial sequence number.

Note that in such a scenario, the server may respond to the out-of-order data with a Duplicate ACK. The Duplicate ACK may also have SACK data if SACK was negotiated. However, if this Duplicate ACK does not have an MPTCP level Data ACK, the client may interpret this as a fallback to TCP, e.g., because the client may not be able to determine if an option stripping middlebox removed the MPTCP option on TCP segments after connection establishment. Thus, although the server may not yet have fully recreated the MPTCP state at this point, it may respond with a Data ACK set to the Data Sequence Number Y-100. The client's TCP implementation may retransmit the first data segment after a TCP retransmit timeout or it may do so as part of an Early Retransmit that can be triggered by an ACK arriving from the server, among various possibilities.

A further consideration relating to use of the techniques described herein may relate to negotiating between MPTCP endpoints regarding support for these techniques. According to some embodiments, in order for MPTCP endpoints to negotiate support for the MP_CAPABLE_EXT option, it may be possible to rely on version information during the MP_CAPABLE exchange. For example, as it may be a new option, the MP_CAPABLE_EXT option may rely on a new version of MPTCP. Accordingly, a client may request this new version of MPTCP during the MP_CAPABLE exchange. If the server supports the requested version, the server may reply with a SYN/ACK including the MP_CAPABLE option and indicating this same version.

If the server then determines to use SYN-cookies and supports receiving the MP_CAPABLE_EXT option, it may set a determined option bit (e.g., the C-bit, as one possibility) to 1. As the client may have indicated in the SYN that it supports the new version of MPTCP in such a scenario, it may then proceed to use the MP_CAPABLE_EXT option in the first data segment.

According to certain embodiments, any or all of the following possible middlebox behaviors and their potential effects may also be taken into consideration according to the techniques described herein.

If a middlebox strips the MP_CAPABLE_EXT option out of the data segment, the server may receive data without a corresponding mapping. In such a case, the server may then seamlessly fallback to regular TCP.

In some instances, a middlebox might coalesce the first and second data segment into one single segment. While doing so, it might remove one of the options (either MP_CAPABLE_EXT or the DSS option of the second segment because of the limited 40 bytes TCP option space). If the DSS-option is not included in the segment, the second half of the payload may not be covered by a mapping. Thus, the server may seamlessly fallback to regular TCP. However, if the MP_CAPABLE_EXT option is not present, then the DSS-option may provide an offset of the TCP sequence number. As the server behaves statelessly, it may only be able to assume that the present mapping belongs to the first byte of the payload. As this may not be the case, it may calculate an incorrect initial TCP sequence number and thus reply with a TCP-reset as the SYN-cookie is invalid.

In some instances, a TCP segmentation offload engine (TSO) might split the first segment into smaller segments and copy the MP_CAPABLE_EXT option on each of these segments. As a result of the data-length value included in the MP_CAPABLE_EXT option, the server may be able to detect this and correctly reconstruct the mapping. In the event the first of these split segments is lost, the TCP sequence number may no longer permit verification of the SYN-cookie and thus a TCP reset may be sent. This behavior may be the same as for regular TCP.

In some instances, a middlebox may modify the payload. The DSS-checksum included in the MP_CAPABLE_EXT option may permit the server to detect such an instance and may trigger a fallback to regular TCP.

FIGS. 6-8 are signal flow diagrams illustrating exemplary signal flows between two endpoint devices performing MPTCP stateless connection establishment, in which information usable for state reconstruction by the server is communicated reliably, according to some embodiments. The signal flows shown in FIG. 6-8 may be used in conjunction with any of the computer systems or devices shown in the above Figures, among other devices. Some of the elements shown may be performed concurrently, in a different order than shown, substituted for by other elements, or may be omitted. Additional elements may also be performed as desired. As shown, the signal flow may operate as follows.

FIG. 6 illustrates an exemplary signal flow for establishing an MPTCP connection between a first endpoint 602 and a second endpoint 604 in which no packets are lost.

The first MPTCP endpoint 602 may send a SYN message with an MP_CAPABLE option 610 to the second MPTCP endpoint 604. As noted above, the MP_CAPABLE option may indicate a version (e.g., a version number) of MPTCP that the first MPTCP endpoint 602 supports. Note that indication of support of a particular version number may also implicitly indicate support of any or all previous versions of MPTCP, according to some embodiments.

The second MPTCP endpoint 604 may respond by sending a SYN/ACK message with an MP_CAPABLE option 612 to the first MPTCP endpoint 602. The SYN/ACK 612 may include an indication to the first MPTCP endpoint 602 to use SYN cookies, which may particularly specify (e.g., based at least in part on the version information indicating that the first endpoint 602 supports them) to utilize the MP_CAPABLE_EXT option as part of the connection establishment handshake.

The first MPTCP endpoint 602 may follow up by sending an ACK message with an MP_CAPABLE option 614 to the second MPTCP endpoint 604. The ACK 614 may include information needed by the second MPTCP endpoint 604 to reconstruct state for the MPTCP connection, e.g., including the key of the first MPTCP endpoint 602 (and possibly the key of the second MPTCP endpoint 604).

Since the second MPTCP endpoint 604 may successfully receive the ACK+MP_CAPABLE message 614, the second MPTCP endpoint 604 may be able to successfully reconstruct the state for the MPTCP connection, and the MPTCP connection may be established.

The first MPTCP endpoint 602 may further follow up by sending a first data segment with an MP_CAPABLE_EXT option 616 on the MPTCP connection. The first MPTCP endpoint 602 may include this information with the first data segment because use of the MP_CAPABLE_EXT option may have been negotiated during the connection establishment handshake (e.g., in order to ensure that the second MPTCP endpoint 604 would be able to reconstruct the state in case the ACK 614 had been lost), even though the second MPTCP endpoint 604 may have already successfully reconstructed the state for the MPTCP connection.

FIG. 7 illustrates an exemplary signal flow for establishing an MPTCP connection between a first endpoint 702 and a second endpoint 704 in which the third message (ACK) of the three-way connection establishment handshake is lost.

The first MPTCP endpoint 702 may send a SYN message with an MP_CAPABLE option 710 to the second MPTCP endpoint 704. The MP_CAPABLE option may indicate a version of MPTCP that the first MPTCP endpoint 702 supports.

The second MPTCP endpoint 704 may respond by sending a SYN/ACK message with an MP_CAPABLE option 712 to the first MPTCP endpoint 702. The SYN/ACK 712 may include an indication to the first MPTCP endpoint 702 to use the MP_CAPABLE_EXT option as part of the connection establishment handshake.

The first MPTCP endpoint 702 may follow up by sending an ACK message with an MP_CAPABLE option 714 to the second MPTCP endpoint 704. The ACK 714 may include information needed by the second MPTCP endpoint 704 to reconstruct state for the MPTCP connection, e.g., including the key of the first MPTCP endpoint 702 (and possibly the key of the second MPTCP endpoint 704).

However, the second MPTCP endpoint 704 may not receive the ACK+MP_CAPABLE message 714, so the second MPTCP endpoint 704 may not yet be able to reconstruct the state for the MPTCP connection.

The first MPTCP endpoint 702 may further follow up by sending a first data segment with an MP_CAPABLE_EXT option 716 on the MPTCP connection, e.g., as negotiated during the connection establishment handshake. The first data segment with an MP_CAPABLE_EXT option 716 may be successfully received by the second MPTCP endpoint 704. Based on the information in the data segment and MP_CAPABLE_EXT option, the second MPTCP endpoint 704 may be able to reconstruct the state even though the ACK 714 was not received. The MPTCP connection may then be established and further communication using the established MPTCP connection may occur between the first MPTCP endpoint 702 and the second MPTCP endpoint 704.

FIG. 8 illustrates an exemplary signal flow for establishing an MPTCP connection between a first endpoint 802 and a second endpoint 804 in which both the third message (ACK) of the three-way connection establishment handshake and the first data segment are lost.

The first MPTCP endpoint 802 may send a SYN message with an MP_CAPABLE option 810 to the second MPTCP endpoint 804. The MP_CAPABLE option may indicate a version of MPTCP that the first MPTCP endpoint 802 supports.

The second MPTCP endpoint 804 may respond by sending a SYN/ACK message with an MP_CAPABLE option 812 to the first MPTCP endpoint 802. The SYN/ACK 812 may include an indication to the first MPTCP endpoint 802 to use the MP_CAPABLE_EXT option as part of the connection establishment handshake.

The first MPTCP endpoint 802 may follow up by sending an ACK message with an MP_CAPABLE option 814 to the second MPTCP endpoint 804. The ACK 814 may include information needed by the second MPTCP endpoint 804 to reconstruct state for the MPTCP connection.

However, the second MPTCP endpoint 804 may not receive the ACK+MP_CAPABLE message 814, so the second MPTCP endpoint 804 may not yet be able to reconstruct the state for the MPTCP connection.

The first MPTCP endpoint 802 may further follow up by sending a first data segment with an MP_CAPABLE_EXT option 816 on the MPTCP connection, e.g., as negotiated during the connection establishment handshake. However, this message also may not be received by the second MPTCP endpoint 804 (or may be received out of order).

The first MPTCP endpoint 802 may further follow up by sending a second data segment with a DSS option 818 on the MPTCP connection. The second MPTCP endpoint 804 may receive the second data segment 818, and may be able to determine (e.g., based on the data sequence mapping between the TCP sequence number and the relative subflow sequence number inside the DSS-mapping) what the initial sequence number would have been. The second MPTCP endpoint 804 may accordingly be able to verify, using the determined initial sequence number, whether the SYN-cookie of the first MPTCP endpoint 802 is correct. If the SYN-cookie of the first MPTCP endpoint 802 is correct, the second MPTCP endpoint 804 may (e.g., temporarily) place the second data segment 818 in the out-of-order queue until the first data segment 816 is received.

The first MPTCP endpoint 802 may further follow up (e.g., upon expiration of a retransmission timer) with a retransmission of the first data segment with an MP_CAPABLE_EXT option 820 (e.g., which may be identical to the original first data segment 816, at least in some embodiments). Alternatively, the first data segment 816 may be received by the second MPTCP endpoint 804 out of order, e.g., after the second data segment 818 is received by the second MPTCP endpoint 804. Based on the information received in the retransmission 820 (or the original transmission of the first data segment 816, e.g., if received out of order), the second MPTCP endpoint 804 may be able to reconstruct the MPTCP state and complete establishment of the MPTCP connection between the first MPTCP endpoint 802 and the second MPTCP endpoint 804.

In some embodiments, it may be possible to send data (e.g., a first data segment) along with a SYN or SYN+MP_CAPABLE message initiating a three way handshake to establish a TCP or MPTCP connection. This feature may be referred to as TCP fast open, or MPTCP fast open, at least in some instances. According to some embodiments, it may be determined to not use an MP_CAPABLE_EXT option for such TCP/MPTCP connection establishment procedures.

Additionally, note that under some circumstances, data may be sent along with the ACK message of a three way handshake. At least in some embodiments, under such circumstances the MP_CAPABLE_EXT may be sent along with the ACK message, e.g., in order to inform the endpoint 804 of the MPTCP mapping for the data.

Note that while with respect to FIGS. 6-8 the first endpoint (e.g., first endpoint 602, first endpoint 702, first endpoint 802) is illustrated and described as performing the role of a MPTCP client endpoint (e.g., initiating an MPTCP connection) and the second endpoint (e.g., second endpoint 602, second endpoint 702, second endpoint 802) is illustrated and described as performing the role of a MPTCP host endpoint (e.g., responding to initiation of an MPTCP connection), these roles are assigned arbitrarily for ease of illustration and explanation, and it may be possible (at least according to some embodiments) for a device to perform the role of either or both of MPTCP host endpoint or MPTCP client endpoint according to various scenarios. Thus, at least in some instances, the first endpoint of any or all of FIGS. 6-8 may also be capable of performing any of the actions described with respect to the second endpoint of any or all of FIGS. 6-8, and/or vice versa.

Figure 9:
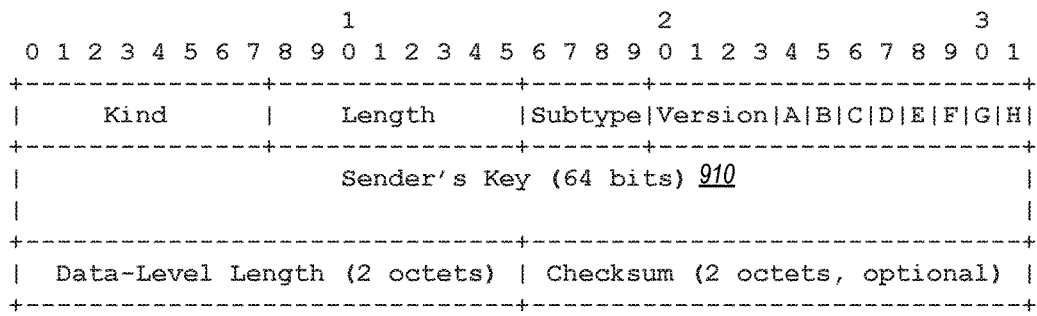
FIGS. 9-10 illustrate example MP_CAPABLE_EXT option formats configured for use when performing robust MPTCP stateless connection establishment.
Figure 10:
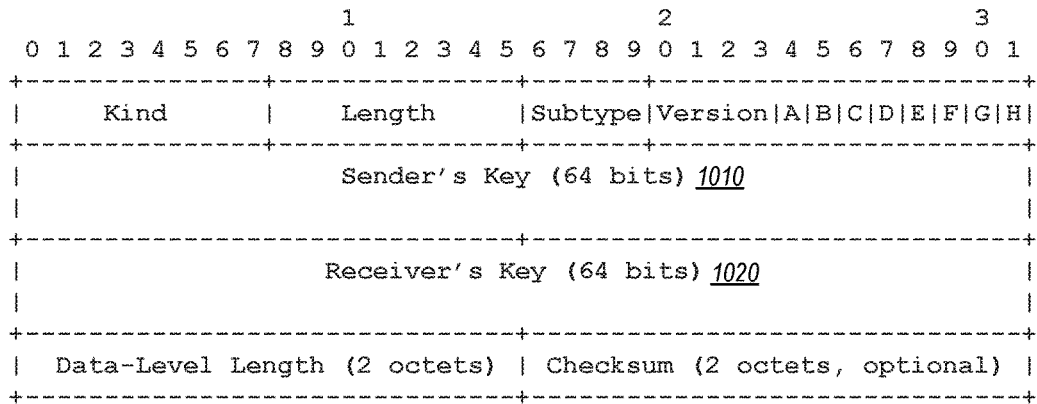

FIGS. 9-10 illustrate examples of possible MP_CAPABLE_EXT option formats, according to some embodiments, for example in conjunction with the techniques of FIGS. 6-8. It should be noted that that any number of alternate formats to those illustrated are also possible, and that while the illustrated exemplary formats are provided as possible examples, they should not be considered limiting to the disclosure as a whole.

As shown, the option may include kind, length, and subtype information, which may identify the option as an MP_CAPABLE_EXT header. For example, a certain value (e.g., 0x10, or any other desired value) of the 'subtype' field may be defined as specifying an MPTCP option as an MP_CAPABLE_EXT option. Additionally, at least in some instances, a certain number of bits may be provided for either or both of specifying a version number and for specifying various features (e.g., bits A-H). According to the exemplary option format illustrated in FIG. 9, the option may also include the sender's key 910. According to the exemplary option format illustrated in FIG. 10, the option may also include both the sender's key 1010 and the receiver's key 1020. In both cases, the option may also include a data-level length field. Further, if so negotiated (e.g., during the three-way handshake), the option may include a checksum field.

In the following further exemplary embodiments are provided.

One set of embodiments may include a method comprising: by a first electronic device: sending a TCP SYN message with an MP_CAPABLE option to a second electronic device, wherein the TCP SYN message initiates a connection establishment handshake for an MPTCP connection; receiving a TCP SYN/ACK message with an MP_CAPABLE option from the second electronic device, wherein the TCP SYN/ACK message indicates to the first electronic device to provide information configured for MPTCP state reconstruction by the second electronic device to the second electronic device in a first data segment of the MPTCP connection; sending a TCP ACK message with an MP_CAPABLE option to the second electronic device; and sending a data segment to the second electronic device over the MPTCP connection, wherein the data segment comprises the information configured for MPTCP state reconstruction by the second electronic device.

A further set of embodiments may include a method, comprising: by a second electronic device: receiving a TCP SYN message with an MP_CAPABLE option from a first electronic device, wherein the TCP SYN message initiates a connection establishment handshake for an MPTCP connection; sending a TCP SYN/ACK message with an MP_CAPABLE option to the first electronic device, wherein the TCP SYN/ACK message indicates to the first electronic device to provide information configured for MPTCP state reconstruction by the second electronic device to the second electronic device with a first data segment of the MPTCP connection; receiving a data segment from the first electronic device over the MPTCP connection; receiving the information configured for MPTCP state reconstruction by the second electronic device with the data segment; and reconstructing state information for the MPTCP connection based on the information configured for MPTCP state reconstruction by the second electronic device.

Another set of embodiments may include an electronic device, comprising: one or more network interfaces; and a processing element operably coupled to the one or more network interfaces; wherein the processing element and the one or more network interfaces are configured to implement any or all of the method elements of any or all of the preceding examples.

A further exemplary set of embodiments may include a non-transitory computer accessible memory medium comprising program instructions which, when executed at a device, cause the device to implement any or all of the method elements of any or all of the preceding examples.

A still further exemplary set of embodiments may include a computer program comprising instructions for performing any or all of the method elements of any or all of the preceding examples.

Yet another exemplary set of embodiments may include an apparatus comprising means for performing any or all of the method elements of any or all of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless device 206) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus, comprising:
a processing element configured to cause a first electronic device to:
perform a multipath transmission control protocol (MPTCP) handshake procedure with a second electronic device to establish a MPTCP connection with the second electronic device, wherein the MPTCP handshake procedure provides reliable delivery of state construction information for a host device of the MPTCP connection and wherein said performing the handshake procedure includes:
sending, to the second electronic device, a first message to initiate the MPTCP connection;
receiving, from the second electronic device, a second message acknowledging the first message;
sending, to the second electronic device, a third message with the state construction information;
sending, to the second electronic device and without receiving a further acknowledgement message in response to the third message, a fourth message including application data and the state construction information.

2. The apparatus of claim 1, wherein the state construction information for the host device comprises any or all of:
MPTCP key information for the client device;
MPTCP key information for the host device;
data sequence signal (DSS) mapping information for the MPTCP connection; or
checksum information.

3. The apparatus of claim 1,
wherein the MPTCP handshake procedure further comprises negotiating whether the MPTCP handshake procedure provides reliable delivery of state construction information for the host device of the MPTCP connection.

4. The apparatus of claim 1, wherein the processing element is further configured to cause the first electronic device to:
determine that a retransmission timer for the fourth message has expired; and
retransmit the fourth message to the second electronic device over the MPTCP connection in response to determining that the retransmission timer for the fourth message has expired,
wherein the retransmitted fourth message includes the application data and the state construction information for the host device.

5. The apparatus of claim 1,
wherein the fourth message includes an MP_CAPABLE_EXT option which includes one or more of a data-level length field or a checksum.

6. The apparatus of claim 1,
wherein content of the fourth message is different than content of the third message.

7. The apparatus of claim 1,
wherein the first message includes version information indicating that the first electronic device is capable of operating according to a MPTCP version that specifies that the state construction information be provided in a first application data segment of the MPTCP connection,
wherein the application data segment is the application data included in the fourth message.

8. A method, comprising:
by a first electronic device:
sending a transmission control protocol (TCP) SYN message with an MP_CAPABLE option to a second electronic device, wherein the TCP SYN message initiates a connection establishment handshake for a multipath TCP (MPTCP) connection;
receiving a TCP SYN/ACK message with an MP_CAPABLE option from the second electronic device, wherein the TCP SYN/ACK message comprises an indication to the first electronic device to provide information configured for MPTCP state reconstruction by the second electronic device to the second electronic device in a first application data segment of the MPTCP connection;
sending a TCP ACK message with an MP_CAPABLE option to the second electronic device; and
sending an application data segment to the second electronic device over the MPTCP connection, wherein the application data segment comprises the information configured for MPTCP state reconstruction by the second electronic device.

9. The method of claim 8,
wherein including the information configured for MPTCP state reconstruction with the application data segment provides reliable delivery of the information configured for MPTCP state reconstruction.

10. The method of claim 8,
wherein the TCP SYN message comprises version information indicating that the first electronic device is capable of operating according to a MPTCP version that specifies that information configured for MPTCP state reconstruction be provided in a first application data segment of the MPTCP connection,
wherein the indication to the first electronic device to provide information configured for MPTCP state reconstruction by the second electronic device to the second electronic device in a first application data segment of the MPTCP connection comprises version information indicating to use a MPTCP version that specifies that information configured for MPTCP state reconstruction be provided in a first application data segment of the MPTCP connection.

11. The method of claim 8,
wherein the information configured for MPTCP state reconstruction comprises at least MPTCP key information for the first electronic device.

12. The method of claim 8, further comprising:
determining that a retransmission timer for the application data segment has expired; and
retransmitting the application data segment to the second electronic device over the MPTCP connection in response to determining that the retransmission timer for the application data segment has expired,
wherein the retransmitted application data segment also includes the information configured for MPTCP state reconstruction.

13. The method of claim 8, further comprising:
receiving an acknowledgment confirming reception of the application data segment by the second electronic device.

14. The method of claim 8, further comprising:
by the first electronic device:
receiving a TCP SYN message with an MP_CAPABLE option from a third electronic device, wherein the TCP SYN message initiates a connection establishment handshake for an MPTCP connection;

sending a TCP SYN/ACK message with an MP_CAPABLE option to the third electronic device, wherein the TCP SYN/ACK message indicates to the third electronic device to provide information configured for MPTCP state reconstruction by the first electronic device to the first electronic device with a first application data segment of the MPTCP connection;

receiving an application data segment from the third electronic device over the MPTCP connection;

receiving the information configured for MPTCP state reconstruction by the first electronic device with the application data segment; and reconstructing state information for the MPTCP connection based on the information configured for MPTCP state reconstruction by the first electronic device.

15. An electronic device, comprising:
one or more network interfaces; and
a processing element operably coupled to the one or more network interfaces;
wherein the processing element and the one or more network interfaces are configured to perform a multipath transmission control protocol (MPTCP) handshake procedure to establish a MPTCP connection between a host endpoint and a client endpoint, wherein to perform the MPTCP handshake procedure, the processing element and the one or more network interfaces are configured to:
negotiate MPTCP version information, wherein at least one possible MPTCP version does not specify use of reliable delivery of state reconstruction information to the host endpoint, wherein at least one possible MPTCP version does specify use of reliable delivery of state reconstruction information to the host endpoint;
reliably exchange host endpoint state reconstruction information when the MPTCP version information negotiation results in use of a MPTCP version that does specify reliable delivery of state reconstruction information to the host endpoint.

16. The electronic device of claim 15,
wherein the host endpoint state reconstruction information is reliably exchanged by including the host endpoint state reconstruction information with a first data segment transmission from the client endpoint to the host endpoint.

17. The electronic device of claim 15, wherein the host endpoint state reconstruction information comprises one or more of:
MPTCP key information for the client device;
MPTCP key information for the host device;
data sequence signal (DSS) mapping information for the MPTCP connection;
checksum information; or
information indicating one or more MPTCP options negotiated for the MPTCP connection.

18. The electronic device of claim 15,
wherein the electronic device is configured to act as the client endpoint of the MPTCP connection, wherein the processing element and the one or more network interfaces are further configured to:
send a TCP SYN message with an MP_CAPABLE option to the host endpoint;
receive a TCP SYN/ACK message with an MP_CAPABLE option from the host endpoint;
send a TCP ACK message with an MP_CAPABLE option to the host endpoint, wherein the TCP ACK message comprises the host endpoint state reconstruction information; and
send a data segment to the host endpoint over the MPTCP connection, wherein the data segment also comprises the host endpoint state reconstruction information.

19. The electronic device of claim 18, wherein the processing element and the one or more network interfaces are further configured to:
determine whether an acknowledgement of the data segment is received prior to expiration of a retransmission timer; and
retransmit the data segment comprising the host endpoint state reconstruction information to the host endpoint over the MPTCP connection when it is determined that an acknowledgement of the data segment is not received prior to expiration of the retransmission timer.

20. The electronic device of claim 15,
wherein the electronic device is configured to act as the host endpoint of the MPTCP connection, wherein the processing element and the one or more network interfaces are further configured to:
receive a TCP SYN message with an MP_CAPABLE option from the client endpoint;
send a TCP SYN/ACK message with an MP_CAPABLE option to the client endpoint;
receive a data segment from the client endpoint over the MPTCP connection, wherein the data segment comprises the host endpoint state reconstruction information; and
reconstruct state information for the MPTCP connection based on the host endpoint state reconstruction information.

* * * * *